(12) United States Patent
Furuta

(10) Patent No.: US 12,403,742 B2
(45) Date of Patent: Sep. 2, 2025

(54) VEHICLE BEHAVIOR CONTROL DEVICE

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 47 days.

(21) Appl. No.: 18/586,915

(22) Filed: Feb. 26, 2024

(65) Prior Publication Data
US 2025/0050699 A1 Feb. 13, 2025

(30) Foreign Application Priority Data
Aug. 10, 2023 (JP) .................... 2023-131228

(51) Int. Cl.
*B60G 17/018* (2006.01)
*B60W 10/22* (2006.01)
*B60W 50/00* (2006.01)

(52) U.S. Cl.
CPC .......... *B60G 17/018* (2013.01); *B60W 10/22* (2013.01); *B60W 50/0098* (2013.01); *B60G 2202/43* (2013.01); *B60W 2050/0022* (2013.01); *B60W 2050/0055* (2013.01)

(58) Field of Classification Search
CPC .............. B60G 17/018; B60G 2202/43; B60G 17/0195; B60W 10/22; B60W 50/0098; B60W 2050/0022; B60W 2050/0055; B60W 10/20; B60W 30/025
USPC .......................................................... 701/37
See application file for complete search history.

(56) References Cited

U.S. PATENT DOCUMENTS

| | | | | |
|---|---|---|---|---|
| 2019/0023095 A1* | 1/2019 | Ficca | ................... | B60W 20/15 |
| 2019/0137023 A1* | 5/2019 | Deister | ................... | F16L 3/015 |
| 2019/0185006 A1* | 6/2019 | Dhaens | ........... | B60W 30/18181 |
| 2023/0097516 A1 | 3/2023 | Furuta | | |

FOREIGN PATENT DOCUMENTS

JP 2023-047810 A 4/2023

* cited by examiner

*Primary Examiner* — Yi-Kai Wang
(74) *Attorney, Agent, or Firm* — SoraIP, Inc.

(57) ABSTRACT

A vehicle behavior control device includes: an ith suspension mounted on an ith wheel of a vehicle (where i=1 to 3); a fourth suspension mounted on a fourth wheel; and a controller. The ith suspension includes an ith actuator. The controller converts a required value of a behavior parameter to an ith required control force for the ith actuator. When a kth required control force (k is any of 1 to 3) is greater than a kth output range according to an output capability of a kth actuator, the controller performs a required control force reduction process of reducing all of first to third required control forces, and controls the ith actuator based on the ith required control force after the required control force reduction process.

5 Claims, 6 Drawing Sheets

VEHICLE BEHAVIOR CONTROL DEVICE

CROSS-REFERENCE TO RELATED APPLICATION

This application claims priority to Japanese Patent Application No. 2023-131228 filed on Aug. 10, 2023, incorporated herein by reference in its entirety.

BACKGROUND

1. Technical Field

The present disclosure relates to techniques for controlling the behavior of a vehicle.

2. Description of Related Art

Japanese Unexamined Patent Application Publication No. 2023-47810 (JP 2023-47810 A) discloses a technique for controlling the behavior of a vehicle using active suspensions. Each active suspension includes an actuator that can actively apply a control force in an up-down direction to a wheel. According to the technique described in JP 2023-47810 A, even when such actuators are mounted on only three wheels, it is possible to implement vehicle behavior control equivalent to the case where the actuators are mounted on four wheels.

SUMMARY

An example in which vehicle behavior control is performed using three actuators as described in JP 2023-47810 A will be considered. When the output of an actuator reaches the upper limit of the output of the actuator, it may cause a feeling of discomfort toward the vehicle behavior.

A first aspect relates to a vehicle behavior control device. The vehicle behavior control device includes:
an ith suspension mounted on an ith wheel of four wheels of a vehicle (where i=1 to 3); a fourth suspension mounted on a fourth wheel other than the ith wheel; and a controller.

The ith suspension includes an ith actuator configured to apply a control force in an up-down direction to the ith wheel.

The controller calculates a required value of a behavior parameter representing behavior of the vehicle.

The controller converts the required value of the behavior parameter to an ith required control force for the ith actuator.

The controller then controls the behavior of the vehicle by controlling the ith actuator based on the ith required control force.

When a kth required control force (where k is any of 1 to 3) is greater than a kth output range according to an output capability of a kth actuator, the controller performs a required control force reduction process of reducing all of a first required control force, a second required control force, and a third required control force, and controls the ith actuator based on the ith required control force after the required control force reduction process.

According to the present disclosure, the required control force reduction process is performed when the kth required control force for the kth actuator is greater than the kth output range according to the output capability of the kth actuator. All of the first to third required control forces for first to third actuators are reduced by the required control force reduction process. The ith actuator is then controlled based on the ith required control force after the required control force reduction process. This reduces the possibility of the output of the ith actuator reaching its output upper limit. As a result, a feeling of discomfort toward the vehicle behavior is less likely to be caused.

As a result of the required control force reduction process, a period during which the kth required control force for the kth actuator is greater than the output upper limit of the kth actuator is reduced. Therefore, a period during which active vehicle behavior control cannot be performed is reduced. This results in improved comfort.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Configuration Example of Vehicle Behavior Control Device

Figure 1:
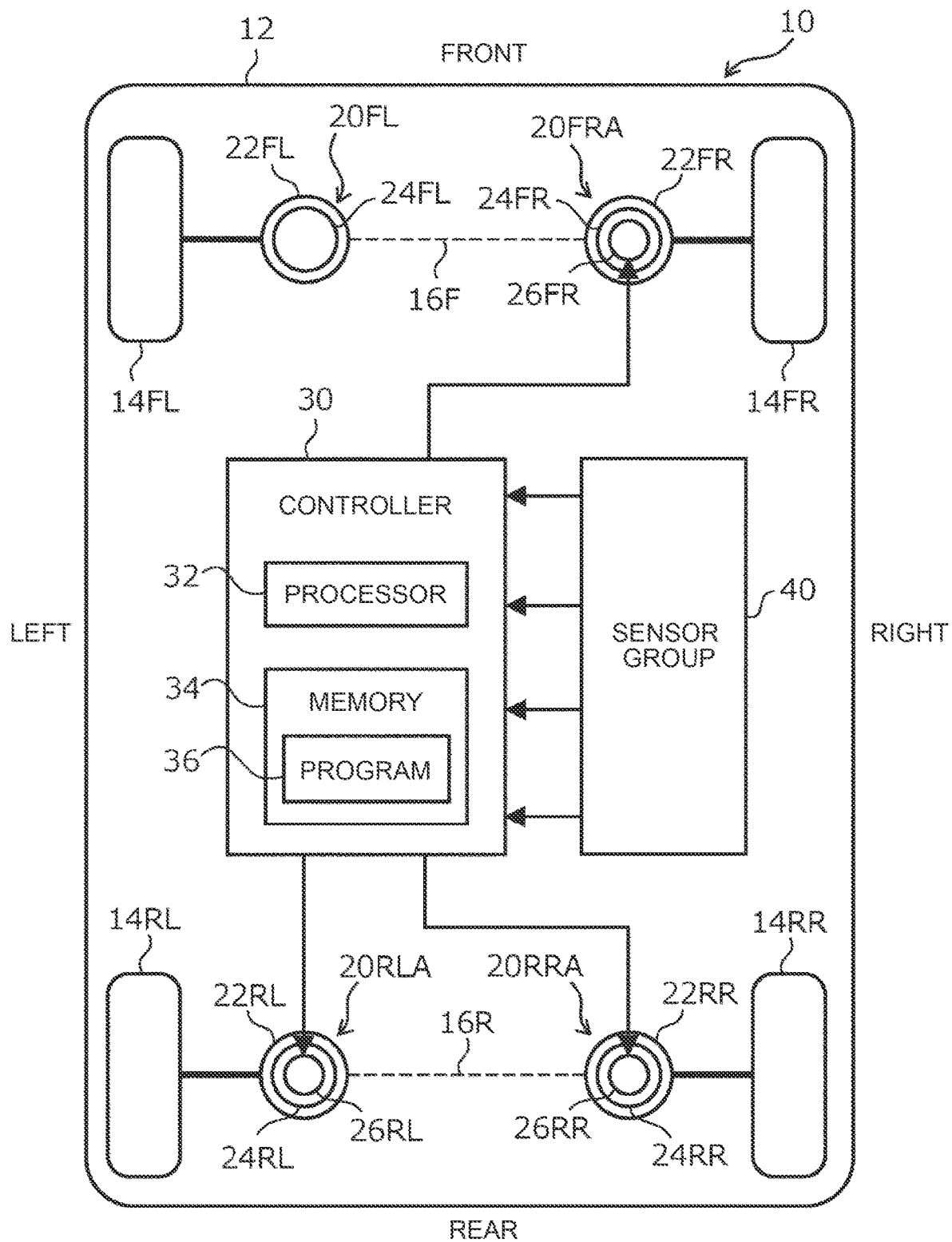
FIG. 1 is a schematic diagram illustrating a configuration example of a vehicle behavior control device.

FIG. 1 is a schematic diagram illustrating a configuration example of a vehicle behavior control device that controls the behavior of a vehicle 10 according to the present embodiment. Vehicle 10 includes a left front wheel 14FL and a right front wheel 14FR in a front shaft 16F. The vehicles 10 are provided with a left rear wheel 14RL and a right rear wheel 14RR in the rear shaft 16R. The vehicle behavior control device includes a suspension 20FL, 20FRA, 20RLA, 20RRA, controllers 30, and a sensor group 40.

The suspension 20FL is provided with respect to the left front wheel 14FL, and suspends the left front wheel 14FL from the vehicle body 12. The suspension 20FL includes a spring 22FL and a shock absorber 24FL.

The suspension 20FRA is provided with respect to the right front wheel 14FR, and suspends the right front wheel 14FR from the vehicle body 12. The suspension 20FRA includes an actuator 26FR in addition to the spring 22FR and the shock absorber 24FR. The actuator 26FR is configured to actively apply a control force in an up-down direction to the right front wheel 14FR. That is, the suspension 20FRA is a fully active suspension.

The suspension 20RLA is provided for the left rear wheel 14RL, and suspends the left rear wheel 14RL from the vehicle body 12. The suspension 20RLA includes an actuator 26RL in addition to the spring 22RL and the shock absorber 24RL. The actuator 26RL is configured to actively apply a control force in the up-down direction to the left rear wheel 14RL. That is, the suspension 20RLA is a fully active suspension.

The suspension 20RRA is provided for the right rear wheel 14RR, and suspends the right rear wheel 14RR from the vehicle body 12. The suspension 20RRA includes an actuator 26RR in addition to the spring 22RR and the shock absorber 24RR. The actuator 26RR is configured to actively apply a control force in the up-down direction to the right rear wheel 14RR. That is, the suspension 20RRA is a fully active suspension.

The configuration and the mechanism of the actuator 26 are not particularly limited. For example, the actuator 26 includes a motor supported by a sprung structure and a torsion bar coupled to an output shaft of the motor. An end portion of the torsion bar is connected to a suspension arm of the suspension 20 via a link mechanism. Rotation of the torsion bar by the motor is converted into movement in the up-down direction of the wheels 14 via a link mechanism. This allows the wheels 14 to be actively moved up and down.

The suspension 20FL provided for the left front wheel 14FL is an inactive suspension without the actuator 26.

The controllers 30 are connected to the sensor group 40 via an in-vehicle network such as a Controller Area Network (CAN). The controller 30 acquires a signal from the sensor group 40. The sensor group 40 includes, for example, a sensor that measures a physical quantity related to the behavior of the vehicle 10, such as an acceleration sensor, a vehicle height sensor, and a wheel speed sensor. The controllers 30 are also connected to the actuator 26RL, 26RR, 26FR via an in-vehicle network.

The controller 30 includes a processor 32 and a memory 34 coupled to the processor 32. The processor 32 performs various processes. The memory 34 stores a program 36 that is executable by the processor 32 and various types of information related to the program 36. The program 36 may be recorded in a computer-readable recording medium. The functions of the controller 30 are implemented by cooperation of the processor 32 executing the program 36 and the memory 34.

The controller 30 performs "vehicle behavior control" for controlling the behavior of the vehicle 10. Examples of the vehicle behavior control include sprung feedback control, unsprung feedback control, attitude control, and preview control. The sprung feedback control suppresses vibration of the sprung member based on the sprung state quantity calculated by using the measurement value of the sprung acceleration sensor. The unsprung feedback control suppresses vibration of the unsprung member based on the unsprung state quantity calculated by using the measured values of the unsprung acceleration sensor and the vehicle height sensor. The attitude control controls the attitude with respect to steering and acceleration/deceleration. In the preview control, a road surface state is pre-read using a database of camera images and high-precision map data, and vibration is suppressed. These various controls may be combined.

The controllers 30 perform desired vehicle behavior control by controlling the actuator 26FR, 26RL, 26RR of the suspension 20FR, 20RL, 20RR based on the signals obtained by the sensor group 40. Although the actuator 26 is not provided for the left front wheel 14FL, the same controllability as when the actuator 26 is provided for all of the four wheels can be achieved by only the three actuator 26FR, 26RL, 26RR. The vehicle behavior control by the three actuator 26FR, 26RL, 26RR will be described in more detail below.

2. Vehicle Behavior Control

The vehicle behavior control by the three actuator 26FR, 26RL, 26RR is the same as that described in, for example, JP 2023-47810 A.

Figure 2:
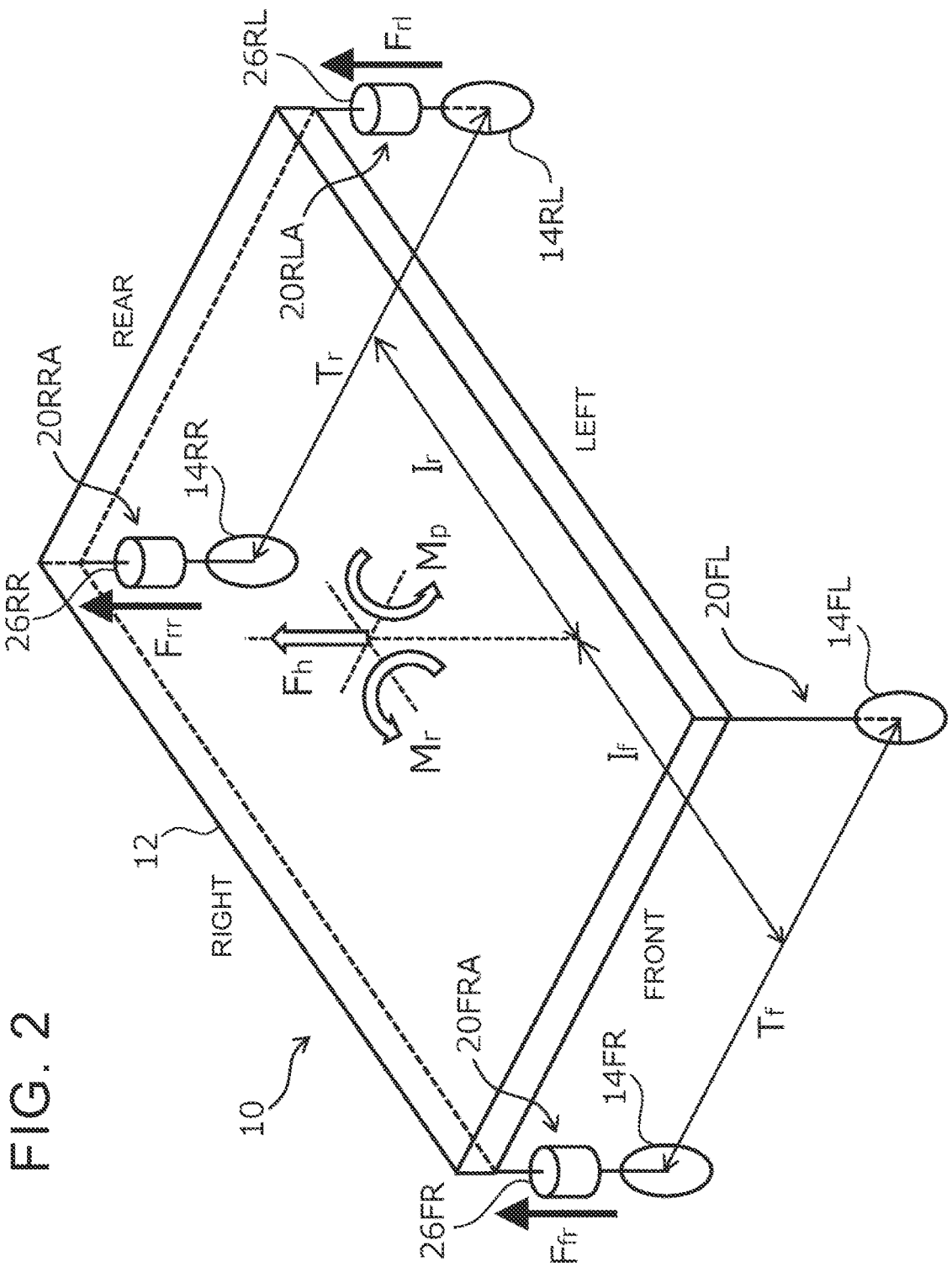
FIG. 2 is a conceptual diagram illustrating vehicle behavior control using three actuators.

FIG. 2 shows a behavior model for vehicle behavior control. The behavior of the vehicle 10 is represented by behavior parameters. In the behavioral model shown in FIG. 2, the behavioral parameters include the mode of motion at the sprung center of gravity position of the vehicle 10, i.e., the roll moment $M_r$, the pitch moment $M_p$, and the heave force $F_h$. Hereinafter, motion modes consisting of a roll moment $M_r$, a pitch moment $M_p$, and a heave force $F_h$ will be referred to as three center-of-gravity modes. The controller 30 first converts the required control force required for any type of vehicle behavior control into the required values of the three center-of-gravity modes (behavior parameters).

For example, for a certain vehicle behavior control, a required control force in the up-down direction is required for each of the four wheels of the vehicle 10. Specifically, a required control force $F_{fli}$ in the up-down direction with respect to the left front wheel 14FL, a required control force $F_{fri}$ in the up-down direction with respect to the right front wheel 14FR, a required control force $F_{rli}$ in the up-down direction with respect to the left rear wheel 14RL, and a required control force $F_{rri}$ in the up-down direction with respect to the right rear wheel 14RR are required. The controller 30 converts the required control forces $F_{fli}$, $F_{fri}$, $F_{rli}$, and $F_{rri}$ for these four wheels into the required values of the three center-of-gravity modes according to Expression (1) below.

(Expression 1)

$$\begin{bmatrix} F_h \\ M_r \\ M_p \end{bmatrix} = \begin{bmatrix} 1 & 1 & 1 & 1 \\ -\frac{T_f}{2} & \frac{T_f}{2} & -\frac{T_r}{2} & \frac{T_r}{2} \\ -l_f & -l_f & l_r & l_r \end{bmatrix} \begin{bmatrix} F_{fri} \\ F_{fli} \\ F_{rri} \\ F_{rli} \end{bmatrix} \quad (1)$$

In Expression (1), lf, lr, Tf, and Tr are a distance between the front shaft 16F and the center of gravity, a distance between the rear shaft 16R and the center of gravity, a front tread, and a rear tread, respectively (see FIG. 2). These parameters are given in advance as specification information of the vehicle 10. The controller 30 computes the required values ($F_h$, $M_r$, $M_p$) of the three center-of-gravity modes based on the specifications information of the vehicle 10 and the required control forces ($F_{fli}$, $F_{fri}$, $F_{rli}$, $F_{rri}$) for the four wheels. The required values of the three center-of-gravity modes may include a roll moment, a pitch moment, and a heave force required for attitude control accompanying steering and acceleration/deceleration.

After calculating the required values $F_h$, $M_r$, and $M_p$ of the three center-of-gravity modes, the controller 30 converts the required values $F_h$, $M_r$, and $M_p$ of the three center-of-gravity modes to required control forces $F_{fr}$, $F_{rr}$, and $F_{rl}$ for the three wheels 14FR, 14RR, and 14RL according to Expression (2) below.

(Expression 2)

$$\begin{bmatrix} F_{fr} \\ F_{rr} \\ F_{rl} \end{bmatrix} = \begin{bmatrix} 1 & 1 & 1 \\ \frac{-T_f}{2} & \frac{-T_r}{2} & \frac{T_r}{2} \\ -l_f & l_r & l_r \end{bmatrix}^{-1} \begin{bmatrix} F_h \\ M_r \\ M_p \end{bmatrix} \quad (2)$$

The required control forces $F_{fr}$, $F_{rr}$, and $F_{rl}$ for the three wheel 14FR, 14RR, and 14RL correspond to the required control forces for the three actuator 26FR, 26RR, and 26RL. The controller 30 controls the actuator 26FR so that the control force in the up-down direction applied to the right front wheel 14FR becomes the required control force $F_{fr}$. Similarly, the controller 30 controls the actuator 26RR so that the control force in the up-down direction applied to the right rear wheel 14RR becomes the required control force $F_{rr}$. Similarly, the controller 30 controls the actuator 26RL so that the control force in the up-down direction applied to the left rear wheel 14RL becomes the required control force $F_{rl}$.

By distributing the required values of the three center-of-gravity modes to the three actuators 26FR, 26RR, and 26RL in this manner, desired behavior including all of the roll, pitch, and heave is implemented in the vehicle 10. That is, the desired vehicle behavior can be implemented by only the three actuators 26FR, 26RR, and 26RL. It is preferable that the required actuator can be reduced from the viewpoints of improvement in mountability, reduction in cost, reduction in weight, power saving, and the like.

The control method of the actuator 26 may be position control (angle control) instead of force control (torque control). Then, the controller 30 calculates the required position control amounts for the three actuators 26FR, 26RR, and 26RL such that the required control forces $F_{fr}$, $F_{rr}$, and $F_{rl}$ for the three actuators 26FR, 26RR, and 26RL represented by the above Expression (2) are obtained. The controllers 30 perform position control of the actuator 26FR, 26RR, 26RL in accordance with the required position control amounts.

In the above explanation, the suspension 20FL provided for the left front wheel 14FL is an inactive suspension without the actuator 26. However, the present embodiment is not limited thereto. Instead of the left front wheel 14FL, the suspension 20 for the other wheels 14 may be an inactive suspension.

The generalization is as follows: I takes a value from 1 to 3. The ith wheel 14-$i$ is provided with an ith suspension 20-$i$ that is an active suspension. The ith suspension 20-$i$ includes an ith actuator 26-$i$ that applies a control force in the up-down direction to the ith wheel 14-$i$. The fourth wheel 14-4 is provided with a fourth suspension 20-4 that is an inactive suspension. The fourth suspension 20-4 does not include the actuator 26.

The controller 30 calculates required values of the behavior parameters representing the behavior of the vehicle 10 (see Expression (1)). Subsequently, the controllers 30 convert the required values of the behavior parameters into the ith required control force Fi for the ith actuator 26-$i$ (see Expression (2)). Then, the controllers 30 control the behavior of the vehicles 10 by controlling the ith actuator 26-$i$ based on the ith required control force Fi. It is preferable in terms of improvement in mountability, reduction in cost, reduction in weight, power saving, etc. that the desired vehicle behavior can be implemented by only three actuators 26-$i$ (i=1 to 3).

3. Required Control Force Reduction Process

Consider a case where the output of an actuator 26 reaches the output upper limit of the actuator 26. For convenience, the actuator 26 is referred to as a jth actuator 26-$j$. j is any of 1 to 3.

In the four-actuator configuration, even if the output of the jth actuator 26-$j$ reaches the output upper limit, the control effectiveness for the jth wheel 14-$j$ is only reduced. However, in the three-actuator configuration as in the present embodiment, the jth actuator 26-$j$ also covers the control of the fourth wheel 14-4 in which the actuator 26 is not provided. Therefore, when the output of the jth actuator 26-$j$ reaches the output upper limit, there is a possibility that a sense of discomfort to the vehicular behavior may occur. For example, consider that there is no actuator 26 in the left front wheel 14FL, and the upper limit of the output of the actuator 26FR with respect to the right front wheel 14FR is smaller than the actuator 26RL, 26RR with respect to the rear wheel 14RL, 14RR. When a large road surface input is applied to the left front wheel 14FL, the output of the actuator 26FR to the right front wheel 14FR is insufficient. As a result, the right front wheel 14FR will swing although it is a road surface input to the left front wheel FL. This causes a sense of discomfort.

In addition, active-vehicle behavior control cannot be performed while the jth required control force 26-$j$ for the jth actuator Fj is greater than the output upper limit of the jth actuator 26-$j$, and thus comfort is reduced. In particular, in the case of a torsion bar active suspension, the stiffness of the torsion bar increases the wheel rate. Therefore, if the vehicle behavior control is not performed, the body vibration tends to increase. If such a state continues, the comfort is greatly reduced.

In order to solve the above-described problem, the controller 30 according to the present embodiment performs a "required control force reduction process" as necessary.

The operation condition for the required control force reduction process is that the kth required control force Fk for the kth actuator 26-$k$ is greater than the kth output range according to the output capability of the kth actuator 26-$k$. k is at least one of 1 to 3. The kth output range according to the output capability of the kth actuator 26-$k$ does not necessarily have to correspond to the maximal output possible range of the kth actuator 26-$k$. For example, the kth output range may be 70% or the like of the maximum possible output range. Information regarding the kth output range is given to the controller 30 in advance. The controller 30 determines whether the operation condition for the required control force reduction process is satisfied. When the operation condition is satisfied, the output of the kth actuator 26-$k$ may reach the output upper limit, and therefore the controller 30 performs the required control force reduction process. Specifically, the controllers 30 reduce all of the first to third required control forces F1 to F3 for the first to third actuators 16-1 to 26-3. Then, the controller 30 controls the behavior of the vehicle 10 by controlling the ith actuator 26-$i$ based on the ith required control force Fi' after the required control force reduction process.

Figure 3A:
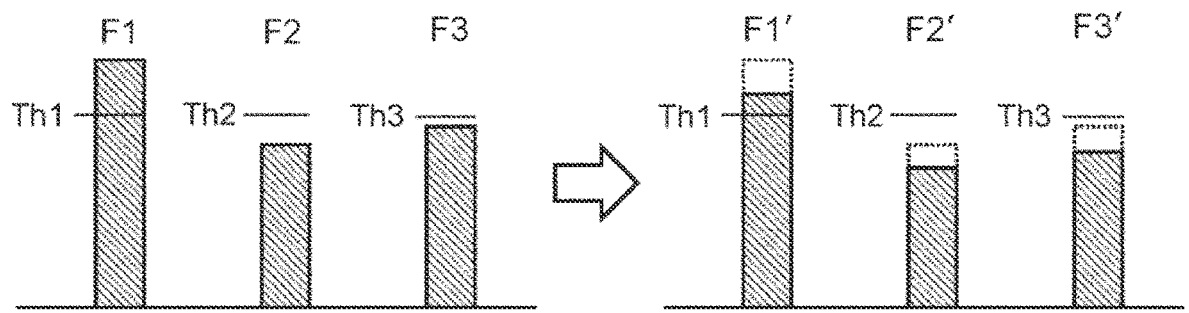
FIG. 3A is a conceptual diagram illustrating an example of a required control force reduction process.
Figure 3B:
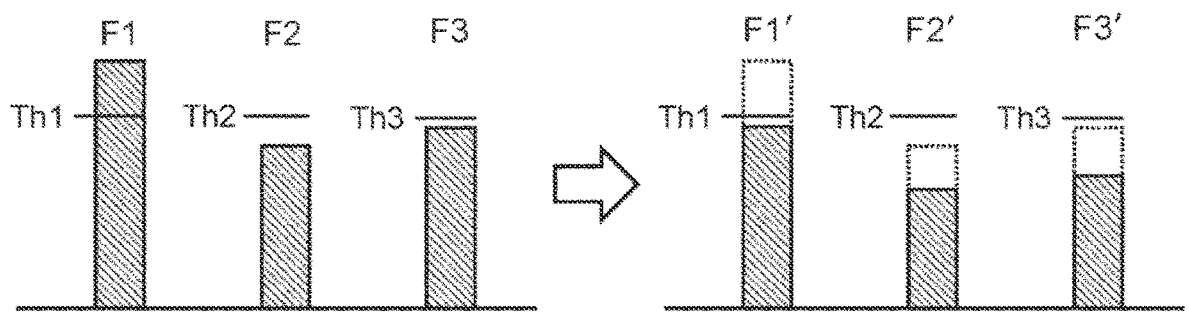
FIG. 3B is a conceptual diagram illustrating an example of the required control force reduction process.
Figure 3C:
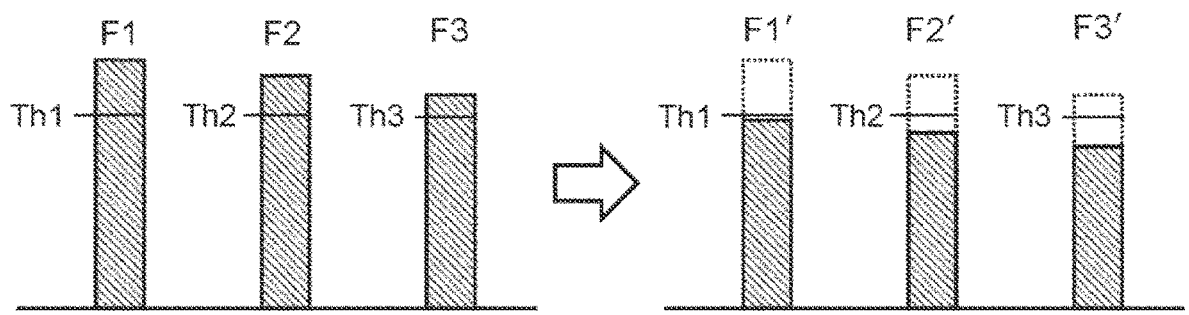
FIG. 3C is a conceptual diagram illustrating an example of the required control force reduction process.

FIGS. 3A to 3C are conceptual diagrams illustrating examples of the required control force reduction process. The limits of the ith output range of the ith actuator 26-$i$ (i=1-3) are represented by ith thresholds Thi. The ith thresholds Thi do not necessarily have to correspond to the maximal power of the ith actuator 26-$i$. For example, the ith thresholds Thi may be 70% of the maximal power, etc. The output ranges (i.e., first threshold Th1 to third threshold Th1)

for the first to third actuators 26-1 to 26-3 depend on the respective actuator capabilities and are independent of each other.

In the illustrated 3A, the first required control force F1 for the first actuator 26-1 is greater than the first threshold Th1 (first output range). Since the operation condition is satisfied, the required control force reduction process is performed. The controller 30 calculates first to third required control forces F1' to F3' by multiplying each of the first to third required control forces F1 to F3 by a correction factor α (0<α<1). The correction factor α may be set to be smaller as the difference between the first required control force F1 and the first threshold Th1 increases.

Also in FIG. 3B, the first required control force F1 for the first actuator 26-1 is greater than the first threshold Th1 (first output range). In the present embodiment, the required control force reduction process is performed such that all of the first to third required control forces F1' to F3' after the required control force reduction process fall within the first to third output ranges, respectively. The correction factor α can be set based on a ratio (F1/Th1) of the first required control force F1 to the first threshold Th1.

In FIG. 3C, the first to third required control forces F1 to F3 for the three actuators 26-1 to 26-3 are greater than the first to third thresholds Th1 to Th3, respectively. Also in this example, the required control force reduction process is performed such that all of the first to third required control forces F1' to F3' after the required control force reduction process fall within the first to third output ranges, respectively. The correction factor α can be set based on the highest one of the three ratios F1/Th1, F2/Th2, and F3/Th3.

Alternatively, the required control force reduction process may apply a high-pass filter to the first to third required control forces F1 to F3. Since the required control force tends to be greater for the lower frequency component, the required control force can be reduced by applying the high-pass filter. In FIG. 3A, the first required control force F1 for the first actuator 26-1 is greater than the first threshold Th1 (first output range). In this case, the larger the difference between the first required control force F1 and the first threshold Th1 is, the higher the filtering effect may be. By increasing the cutoff frequency of the high-pass filter or increasing the order of the high-pass filter, the filter effect can be enhanced.

As yet another example, the required control force reduction process may reduce the control gain of the vehicle behavior control. More specifically, the vehicle behavior control includes first vehicle behavior control for a road surface input and second vehicle behavior control for an operation input (steering, acceleration, or deceleration). The controller 30 calculates required values of the behavior parameters based on the first control gain G1 of the first vehicle behavior control and the second control gain G2 of the second vehicle behavior control. In the required control force reduction process, the controller 30 performs a "gain reduction process" of reducing either or both of the first control gain G1 and the second control gain G2. Then, the controller 30 calculates the required values of the behavior parameters again based on the first control gain G1' and the second control gain G2' after the gain reduction process. This can also reduce all of the first to third required control forces F1 to F3 for the first to third actuators 26-1 to 26-3.

Various examples of the gain reduction processing are conceivable. For example, the controller 30 may multiply each of the first control gain G1 and the second control gain G2 by a correction factor β (0<β<1).

As another example of the gain reduction process, the priorities of the first vehicle behavior control and second vehicle behavior control may be considered. More specifically, the first correction factor β1 is greater than 0 and equal to or less than 1 (0<β1≤1), and decreases as the priority of the first vehicle behavior control decreases. The second correction factor β2 is greater than 0 and equal to or less than 1 (0<β2≤1), and decreases as the priority of the second vehicle behavior control decreases. The controller 30 multiplies the first correction factor β1 by the first control gain G1, and multiplies the second correction factor β2 by the second control gain G2. The correction factor for the first vehicle behavior control or the second vehicle behavior control, whichever has higher priority, may be set to 1.0. Then, only the first control gain G1 or the second control gain G2 decreases.

The first control gain G1 of the first vehicle behavior control may be further divided into a feedback gain and a feedforward gain, and the priorities of the feedback gain and the feedforward gain may be considered. The second control gain G2 of the second vehicle behavior control may be further divided into a steering input gain and an acceleration/deceleration input gain, and the priorities of the steering input gain and the acceleration/deceleration input gain may be considered.

Two or more of the above examples of the required control force reduction process may be combined.

As described above, according to the present embodiment, when the kth required control force Fk for the kth actuator 26-k is greater than the kth output range according to the output capability of the kth actuator 26-k, the required control force reduction process is performed. The required control force reduction process reduces all of the first to third required control forces F1 to F3 for the first to third actuators 26-1 to 26-3. The ith actuator 26-i is then controlled based on the ith required control force Fi' after the required control force reduction process. This reduces the likelihood that the output of the ith actuator 26-i reaches the output upper limit. As a result, the occurrence of a sense of discomfort with respect to the vehicle behavior is suppressed.

As a result of the required control force reduction process, the period during which the kth required control force Fk for the kth actuator 26-k is greater than the output upper limit of the kth actuator 26-k is reduced. Therefore, the period during which the active vehicle behavior control cannot be performed is shortened. As a result, comfort is improved.

Preferably, the required control force reduction process is performed such that the ith required control force Fi' after the required control force reduction process falls within the ith output range according to the output capability of the ith actuator. In this case, the above-mentioned effects are further increased.

4. Example of Process Flow

Hereinafter, some examples of the process flow related to the vehicle behavior control according to the present embodiment will be described.

4-1. First Example

Figure 4:
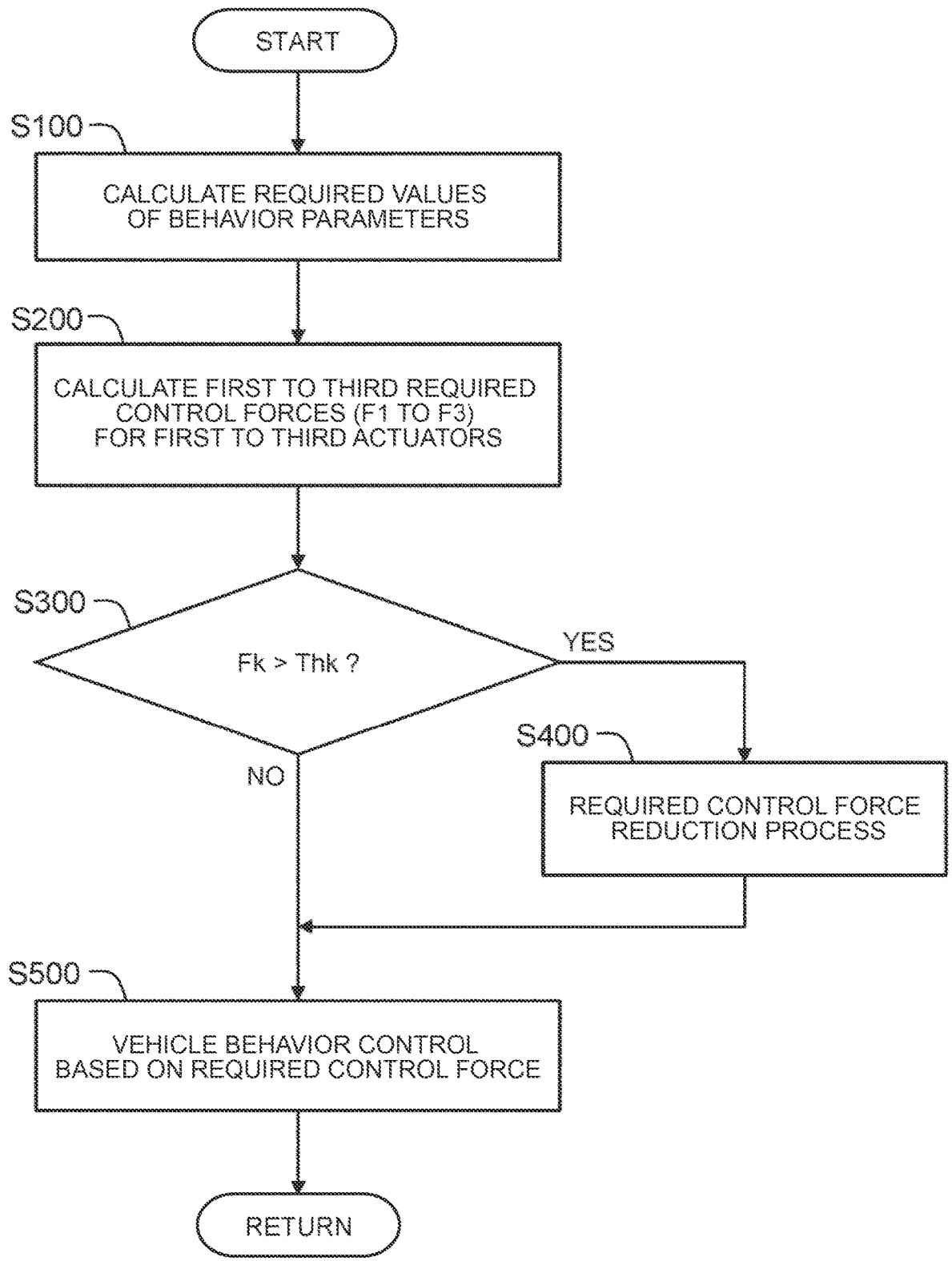
FIG. 4 is a flowchart illustrating a first example of a process related to the vehicle behavior control.

FIG. 4 is a flowchart illustrating a first example of a process related to vehicle behavior control. In S100, the controllers 30 calculate required values of the behavior parameters representing the behavior of the vehicles 10 (see Expression (1)). In S200, the controller 30 converts the required values of the behavior parameters to the first to third required control forces F1 to F3 for the first to third actuators 26-1 to 26-3 (see Expression (2)).

In the subsequent step S300, the controller 30 determines whether the operation condition for the required control force reduction process is satisfied. The operation condition for the required control force reduction process is that the kth required control force Fk for the kth actuator 26-$k$ is greater than the kth output range (kth threshold Thk) according to the output capability of the kth actuator 26-$k$.

When the operating condition is not satisfied (S300; No), the process proceeds to S500. In S500, the controllers 30 perform the vehicle behavior control by controlling the ith actuator 26-$i$ based on the ith required control force Fi.

On the other hand, when the operating condition is satisfied (S300; Yes), the process proceeds to S400. In S400, the controllers 30 perform the required control force reduction process. The required control force reduction process is as described in Section 3 above. Thereafter, the process proceeds to S500. In S500, the controllers 30 perform the vehicle behavior control by controlling the ith actuator 26-$i$ based on the ith required control force Fi' after the required control force reduction process.

4-2. Second Example

Figure 5:
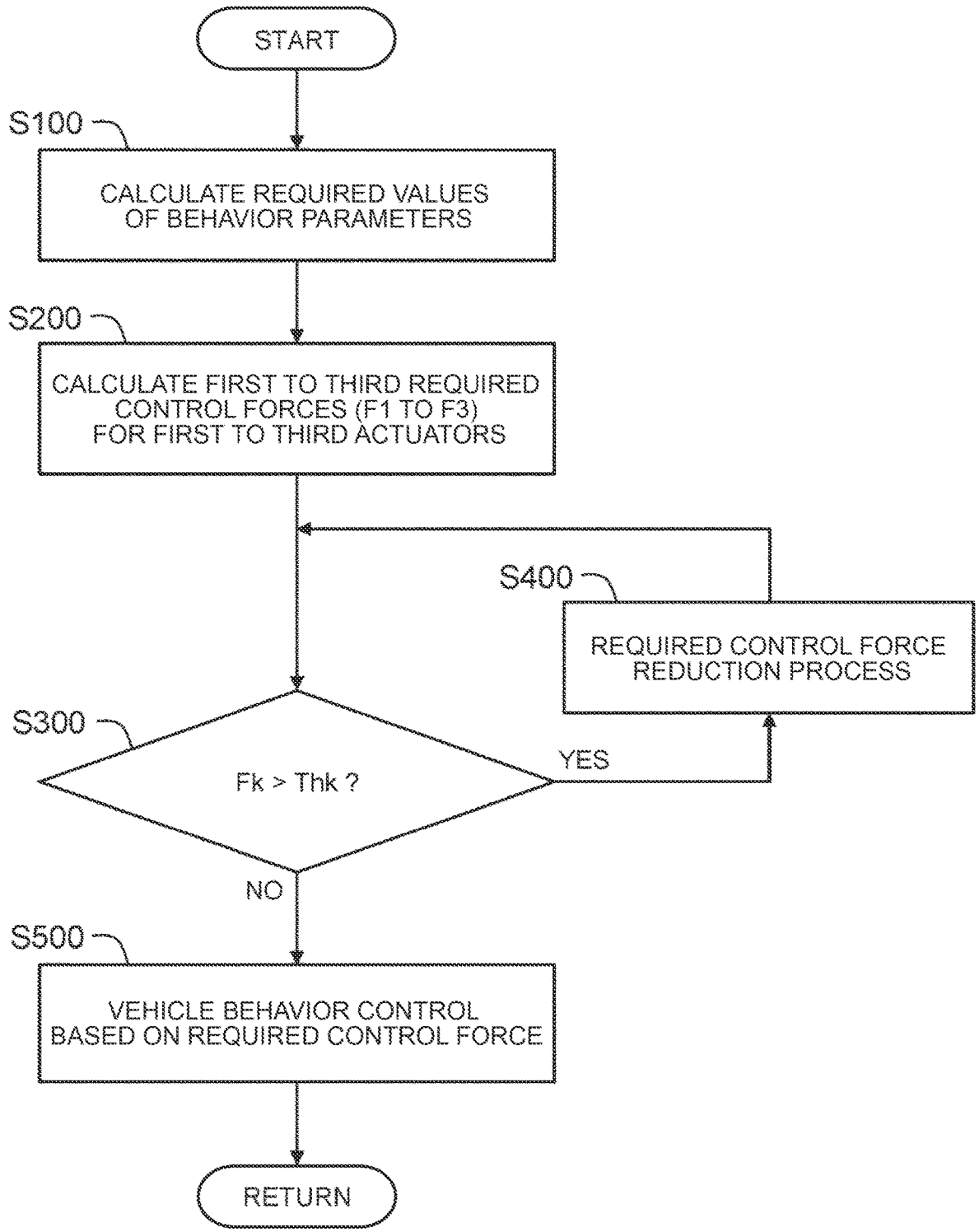
FIG. 5 is a flowchart illustrating a second example of the process related to the vehicle behavior control.

FIG. 5 is a flowchart illustrating a second example of a process related to vehicle behavior control. The second example is the same as the first example described above except for S400. In S400, the controllers 30 perform the required control force reduction process. In this required control force reduction process, it is not checked whether all of the first to third required control force F1' to F3' after the required control force reduction process fall within the first to third output ranges, respectively. Instead, after S400, the process returns to S300. By repeating S300 and S400, it is ensured that all of the first to third required control forces F1' to F3' after the required control force reduction process fall within the first to third output ranges, respectively.

4-3. Third Example

Figure 6:
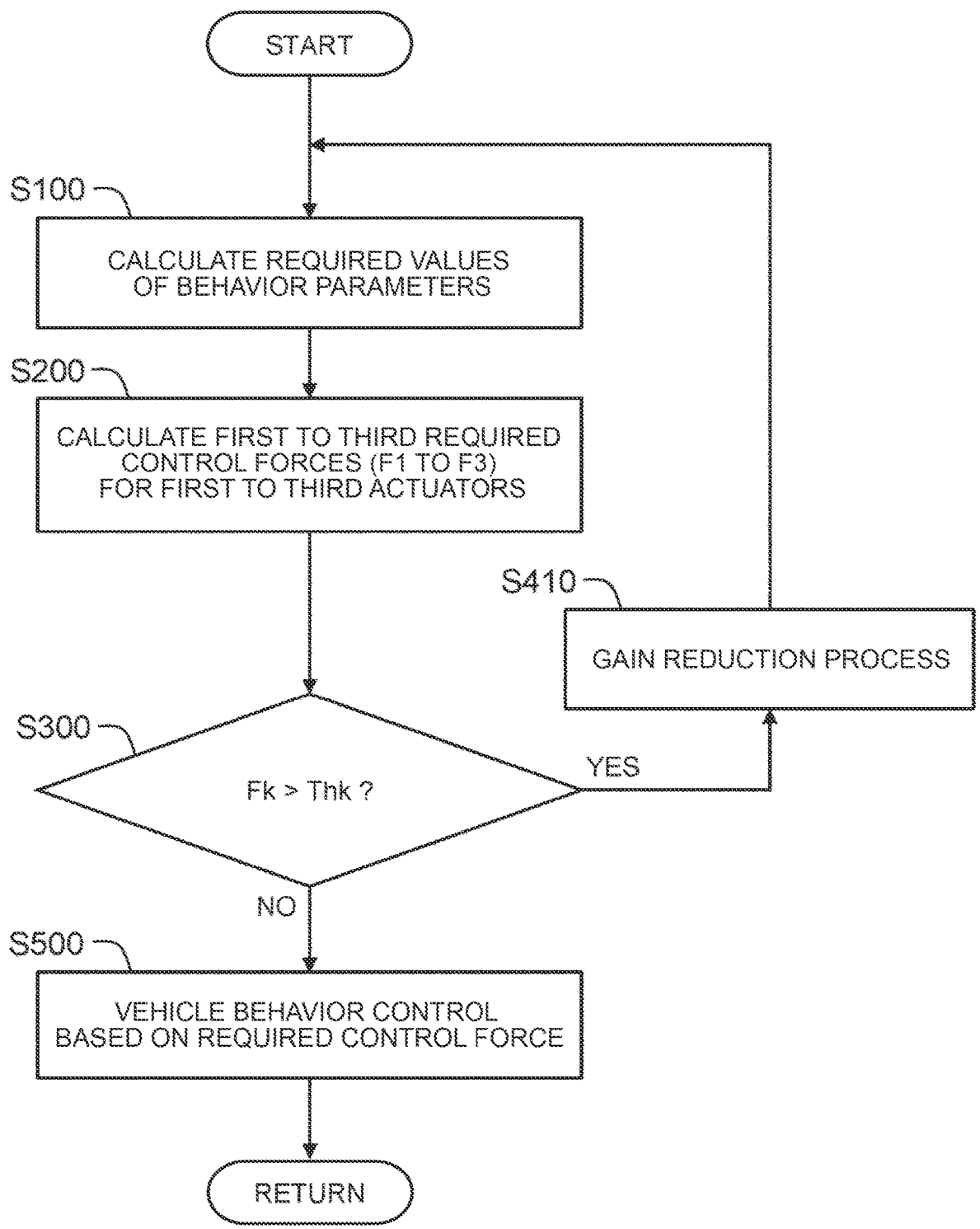
FIG. 6 is a flowchart illustrating a third example of the process related to the vehicle behavior control.

FIG. 6 is a flowchart illustrating a third example of a process related to vehicle behavior control. The vehicle behavior control includes first vehicle behavior control for a road surface input and second vehicle behavior control for an operation input (steering, acceleration, or deceleration).

In S100, the controller 30 calculates the required values of the behavior parameters based on the first control gain G1 of the first vehicle behavior control and the second control gain G2 of the second vehicle behavior control. S200 and S300 are the same as in the first example. When the operation condition for the required control force reduction process is satisfied (S300; Yes), the process proceeds to S410.

In S410, the controller 30 performs a gain reduction process of reducing either or both of the first control gain G1 and the second control gain G2. Various examples of the gain reduction process are as described above. After S410, the process returns to S100. In S100, the controller 30 calculates the required values of the behavior parameters again based on the first control gain G1' and the second control gain G2' after the gain reduction process. In a subsequent S200, the controller 30 converts the required values of the behavior parameters from the first to third required control forces F1 to F3 for the first to third actuators 26-1 to 26-3.

In this way, it is also possible to reduce all of the first to third required control forces F1 to F3 by the gain reduction process. It can also be said that the combination of S410, S100, and S200 is the required control force reduction process (S400).

What is claimed is:

1. A vehicle behavior control device, comprising:
   an ith suspension mounted on an ith wheel of four wheels of a vehicle (where i=1 to 3);
   a fourth suspension mounted on a fourth wheel other than the ith wheel; and
   a controller, wherein
   the ith suspension includes an ith actuator configured to apply a control force in an up-down direction to the ith wheel,
   the controller is configured to
      calculate a required value of a behavior parameter representing behavior of the vehicle,
      convert the required value of the behavior parameter to an ith required control force for the ith actuator, and
      control the behavior of the vehicle by controlling the ith actuator based on the ith required control force, and
   the controller is configured to, when a kth required control force (where k is any of 1 to 3) is greater than a kth output range according to an output capability of a kth actuator, perform a required control force reduction process of reducing all of a first required control force, a second required control force, and a third required control force, and control the ith actuator based on the ith required control force after the required control force reduction process.

2. The vehicle behavior control device according to claim 1, wherein the required control force reduction process includes either or both of
   multiplying each of the first required control force, the second required control force, and the third required control force by a correction factor of less than one, and
   applying a high-pass filter to the first required control force, the second required control force, and the third required control force.

3. The vehicle behavior control device according to claim 1, wherein the controller is configured to perform the required control force reduction process in such a manner that the ith required control force after the required control force reduction process is within an ith output range according to an output capability of the ith actuator.

4. The vehicle behavior control device according to claim 1, wherein
   control of the behavior of the vehicle includes first vehicle behavior control for a road surface input and second vehicle behavior control for steering, acceleration, or deceleration,
   the controller is configured to calculate the required value of the behavior parameter based on a first control gain of the first vehicle behavior control and a second control gain of the second vehicle behavior control, and
   the required control force reduction process includes a gain reduction process of
      reducing either or both of the first control gain and the second control gain, and
      calculating the required value of the behavior parameter again based on the first control gain and the second control gain after the gain reduction process.

5. The vehicle behavior control device according to claim 4, wherein the gain reduction process is either
   multiplying each of the first control gain and the second control gain by a correction factor of less than one, or
   multiplying the first control gain by a first correction factor and multiplying the second control gain by a second correction factor, the first correction factor being a correction factor that decreases as priority of the first vehicle behavior control decreases, and the second correction factor being a correction factor that decreases as priority of the second vehicle behavior control decreases.

\* \* \* \* \*